(12) United States Patent
Chung et al.

(10) Patent No.: US 6,950,922 B2
(45) Date of Patent: Sep. 27, 2005

(54) DATA EXTRACTION/INSERTION METHOD AND DEVICE IN DIGITAL SIGNAL PROCESSOR

(75) Inventors: Seung-jae Chung, Suwon (KR); Yong-chun Kim, Yongin (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 376 days.

(21) Appl. No.: 10/388,146

(22) Filed: Mar. 13, 2003

(65) Prior Publication Data

US 2003/0212876 A1 Nov. 13, 2003

(30) Foreign Application Priority Data

May 7, 2002 (KR) .................................. 10-2002-0025133

(51) Int. Cl.[7] .............................................. G06F 12/00
(52) U.S. Cl. ........................... 711/220; 341/60; 341/67; 711/201; 711/214; 711/217; 712/34; 712/300
(58) Field of Search ............................ 341/60, 67, 101; 370/379, 382, 902, 912; 710/9, 26; 711/165, 171, 172, 173, 201, 212, 214, 217, 220; 712/34, 35, 300

(56) References Cited

U.S. PATENT DOCUMENTS

| 5,119,092 | A | * | 6/1992 | Sumi et al. ................. 341/60 |
| 5,557,271 | A | * | 9/1996 | Rim et al. .................. 341/67 |
| 5,913,229 | A | | 6/1999 | Joo ........................... 711/200 |
| 6,745,314 | B1 | * | 6/2004 | Wichman .................. 711/214 |

FOREIGN PATENT DOCUMENTS

WO      WO 02088937      11/2002

OTHER PUBLICATIONS

"Minimization of Data Address Computation Overhead in DSP Programs," Wess et al, Acoustics, Speech, and Signal Processing, 1998. ICASSP '98. Proceedings of the 1998 IEEE I Conference on, vol. 5 May 12–15, 1998, pp. 3093–3096.*

"Optimal DSP Memory Layout Generation as a Quadratic Assignment Problem," Wess et al, Circuits and Systems, 1997. ISCAS '97., Processings of 1997 IEEE International Symposium on, vol. 3, Jun. 9–12, 1997, pp. 1712–1715.*

"DSP Data Memory Layouts Optimized for Intermediate Address Pointer Updates," Wess et al, Circuits and Systems, 1998, IEEE APCCAS 1998. The 1998 IEEE Asia–Pacific Conference on, Nov. 24–27, 1998, pp. 451–454.*

* cited by examiner

Primary Examiner—Christian Chace
(74) Attorney, Agent, or Firm—F. Chau & Associates, LLC

(57) ABSTRACT

A data extraction/insertion device in a digital signal processor and a method thereof are provided. The data extraction/insertion method is performed in a digital signal processor including a source register and a destination registr. In this digital signal processor, data is extracted from the source register and inserted into the destination register using a position value, which represents the reference position of data extraction, and an offset value, which represents the size of data to be extracted. Accordingly, a sequence of data packets, the size of which are given in neither byte nor word unit, are effectively extracted or inserted, thus saving the space of a memory.

18 Claims, 6 Drawing Sheets

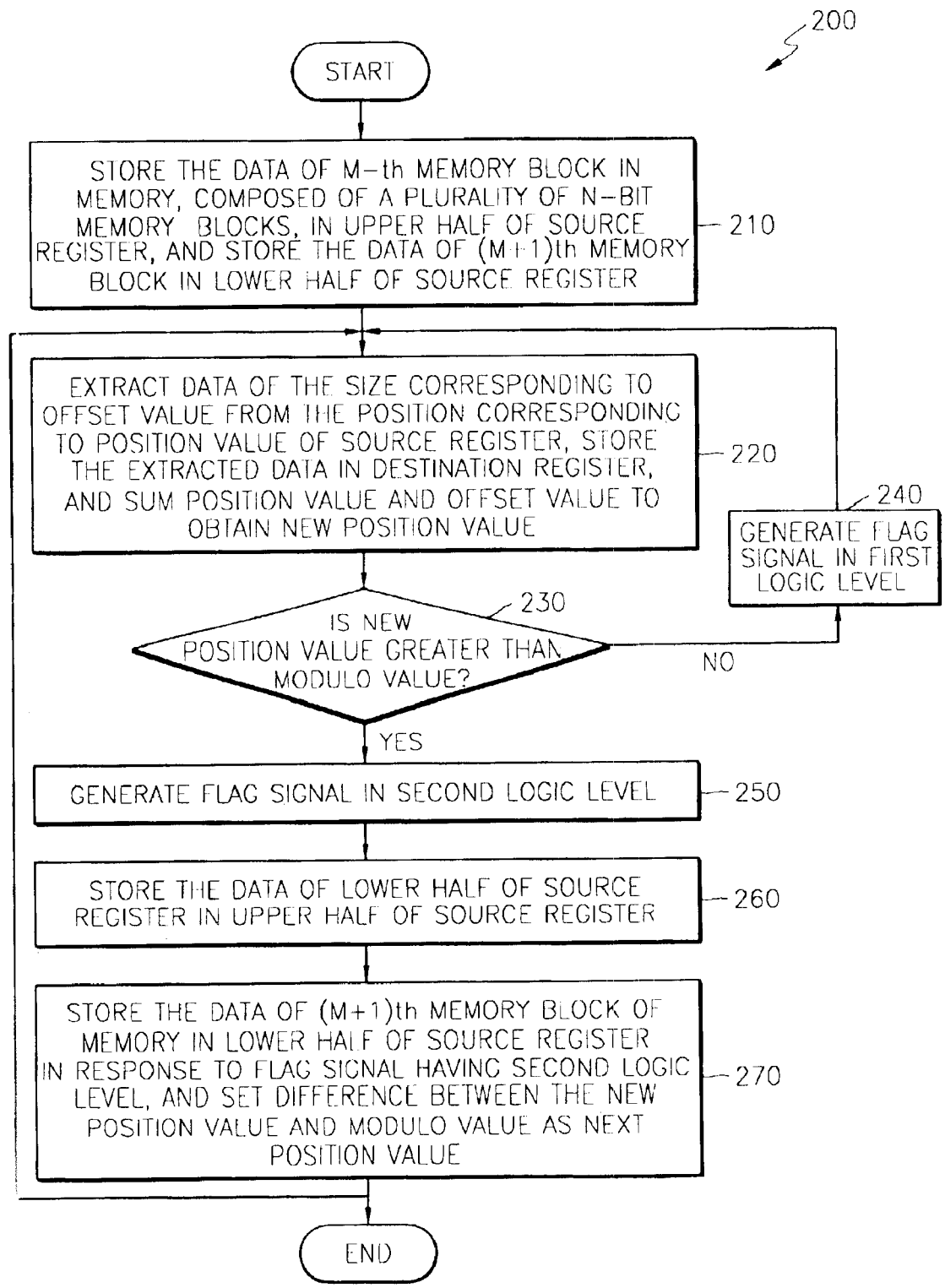

DATA EXTRACTION/INSERTION METHOD AND DEVICE IN DIGITAL SIGNAL PROCESSOR

BACKGROUND OF THE INVENTION

1. Field of the Invention

The present invention relates to the field of digital signal processors, and more particularly, to a data extraction/insertion method and device capable of effectively utilizing a memory by consecutively extracting and inserting data packets.

2. Discussion of Related Art

In general, recent digital signal processors (hereinafter referred to as DSP) can process packet-unit communication data through a data extraction and data insertion process.

FIGS. 1A and 1B are conceptual diagrams of a data extraction and insertion process performed in a DSP. Referring to FIG. 1A, data extraction denotes extracting data of a predetermined size from a source register S_REG and storing extracted data in a destination register D_REG. Data extraction is performed using a position value POS that represents a reference position in the source register from which data is to be extracted, and an offset value WTH that represents a size of data to be extracted.

Data of a predetermined size corresponding to the offset value WTH is extracted from a particular position in the source register S_REG corresponding to the position value POS.

Referring to FIG. 1B, data insertion denotes inserting data of a predetermined size in the source register S_REG into a particular position in the destination register D_REG. The particular position in the destination register D_REG is determined depending on a position value POS that represents a reference position in the destination register into which data is to be inserted.

Data of a predetermined size corresponding to the offset value WTH is inserted into a particular position in the destination register D_REG corresponding to a position value POS that represents the size of data to be inserted.

However, such data extraction and insertion is not suitable for a sequence of data packets a size unit of which is not based on bytes or words. In this case, a memory is ineffectively utilized and memory space is wasted, because bytes or words data packets cannot be stored in the memory without leaving empty spaces.

A need, therefore, exists for a data extraction/insertion method or device capable of saving the space of a memory by effectively extracting and inserting a sequence of data packets a size unit of which is not based on bytes or words.

SUMMARY OF THE INVENTION

According to an embodiment of the present invention, a data extraction method is provided. The data extraction method is performed in a digital signal processor that includes a source register and a destination register and extracts data from the source register and stores an extracted data in the destination register using a position value and an offset value. The position value represents the reference position of data extraction, and the offset value represents the size of data to be extracted. The data extraction method includes steps (a) through (e). In step (a), the data of an M-th memory block in a memory having a plurality of N-bit memory blocks is stored in the upper half of the source register, and the data of an (M+1)th memory block is stored in the lower half of the source register. Here, M and N are natural numbers. In step (b), data, a size of which is corresponding to the offset value, is extracted the position corresponding to the position value in the source register and stored in the destination register, and the position value and the offset value are summed to obtain a new position value. In step (c), it is determined whether the new position value is greater than a predetermined modulo value. If the new position value is smaller than the modulo value, a flag signal in a first logic level is generated. If the new position value is greater than the modulo value, a flag signal in a second logic level is generated. In step (d), steps (b) and (c) are repeated using the new position value if the flag signal has a first logic level, and the data of the lower half of the source register is stored in the upper half of the source register if the flag signal is in a second logic level. In step (e), the data of an (M+2)th memory block of the memory is stored in the lower half of the source register in response to the flag signal in the second logic level. The difference between the new position value and the modulo value is set to be a next position value, and the method goes back to step (b).

Each of the source and destination registers has a 2N-bit size, and the modulo value is N.

According to an embodiment of the present invention, a data insertion method is provided in a digital signal processor. The digital signal processor includes a source register and a destination register and inserts data from the source register into the destination register using a position value and an offset value. The position value represents a reference position into which data is to be inserted, and the offset value represents a size of data to be inserted. The data insertion method includes steps (a) through (d). In step (a), data of the size corresponding to the offset value among data in the source register, is inserted into a position corresponding to the position value in the destination register, and the position value and the offset value are summed to obtain a new position value. In step (b), it is determined whether the new position value is greater than a predetermined modulo value. If the new position value is smaller than the modulo value, a flag signal in a first logic level is generated. If the new position value is greater than the modulo value, a flag signal in a second logic level is generated. In step (c), steps (a) and (b) are repeated using the new position value if the flag signal has a first logic level. If the flag signal is in a second logic level, the data of the upper half of the destination register is stored in the M-th memory block of a memory having a plurality of N-bit memory blocks. Here, M and N are natural numbers. In step (d), in response to the flag signal with the second logic level, the data of the lower half of the destination register is stored in the upper half of the destination register, and the difference between the new position value and the modulo value is set to be a next position value. The method goes back to step (a). Each of the source and destination registers has a 2N-bit size, and the modulo value is N.

According an embodiment of the present invention, a data extraction and insertion device is provided in a digital signal processor. The device includes a data extraction and insertion unit, a position value generation unit, and a flag signal generation unit. The data extraction and insertion unit receives a pre-position value and an offset value representing the size of a data to be extracted, extracts or inserts data from a source register to a destination register in response to the first logic level of a flag signal, and stores data received from a memory in a source or destination register or stores data received from the source or destination register in the memory in response to the second logic level of the flag signal.

The position value generation unit sums the pre-position value and the offset value both received from external sources to obtain a position value.

The flag signal generation unit receives the position value. If the position value is smaller than a predetermined modulo value, the flag signal generation unit outputs the position value as a pre-position value. If the position value is greater than the modulo value, the difference between the position value and the modulo value is set to be the pre-position value. The flag signal generation unit generates a flag signal depending on the result of the comparison of the position value with the modulo value.

The position value generation unit includes: a pre-position value storage unit for storing the pre-position value; an offset value storage unit for storing an offset value received from an external source; and an adder for adding an output of the offset value storage unit to an output of the pre-position value storage unit to obtain the position value.

The flag signal generation unit includes a modulo value storage unit, a comparator, a subtractor, and a selector. The comparator compares the position value with the modulo value received from the modulo value storage unit, outputs the position value to a selector if the position value is smaller than the modulo value, outputs the position value to a subtractor if the position value is greater than the modulo value, and generates a flag signal depending on the result of the comparison of the position value with the modulo value. The subtractor receives the position value and the modulo value and subtracts the modulo value from the position value. The selector selects one either from the position value output from the comparator or an output of the subtractor in response to the flag signal to output a selected value as the pre-position value.

The comparator generates the flag signal having a first logic level if the position value is smaller than the modulo value. If the position value is greater than the modulo value, the comparator generates the flag signal having a second logic level.

The selector selects the position value output from the comparator if the flag signal is in a first logic level, and selects the output of the subtractor if the flag signal is in a second logic level.

Upon data extraction, in response to the flag signal in a first logic level, the data extraction and insertion unit inserts data of the size corresponding to the offset value among data in the source register, into the position corresponding to the pre-position value in the destination register. In response to the flag signal in a second logic level, the data extraction and insertion unit stores the data of the lower half of the source register in the upper half of the source register, and also stores the data of the M-th memory block of a memory, which has a plurality of N-bit memory blocks, in the lower half of the source register. Here, M and N are natural numbers.

Upon data insertion, in response to the flag signal in a first logic level, the data extraction and insertion unit inserts data of the size corresponding to the offset value, into the position corresponding to the pre-position value in the destination register. In response to the flag signal with a second logic level, the data extraction and insertion unit stores the data of the upper half of the destination register in the M-th memory block of a memory having a plurality of N-bit memory blocks, and also stores the data of the lower half of the destination register in the upper half of the destination register. Here, M and N are natural numbers.

Each of the source and destination registers has a 2N-bit size, and the modulo value is N.

BRIEF DESCRIPTION OF THE DRAWINGS

The present invention will become more apparent by describing in detail preferred embodiments thereof with reference to the attached drawings in which:

FIG. 2 is a flowchart illustrating a data extraction method according to a preferred embodiment of the present invention;

DETAILED DESCRIPTION OF PREFERRED EMBODIMENTS

Figure 1A:
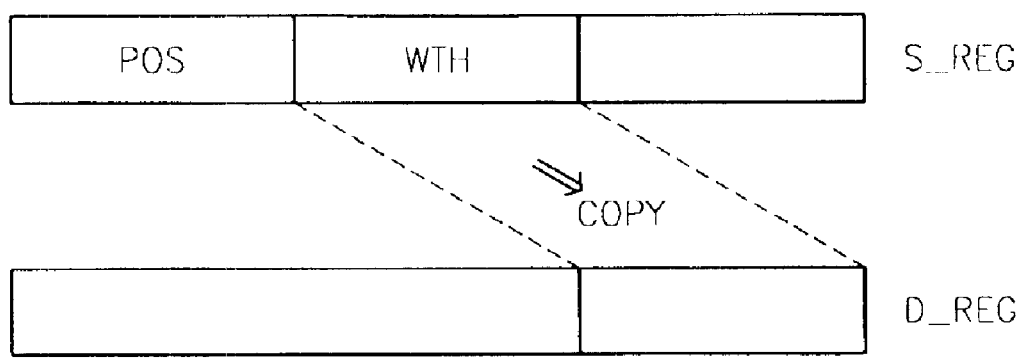
FIGS. 1A and 1B are diagrams showing conventional data extraction and data insertion performed in a DSP, respectively.
Figure 1B:
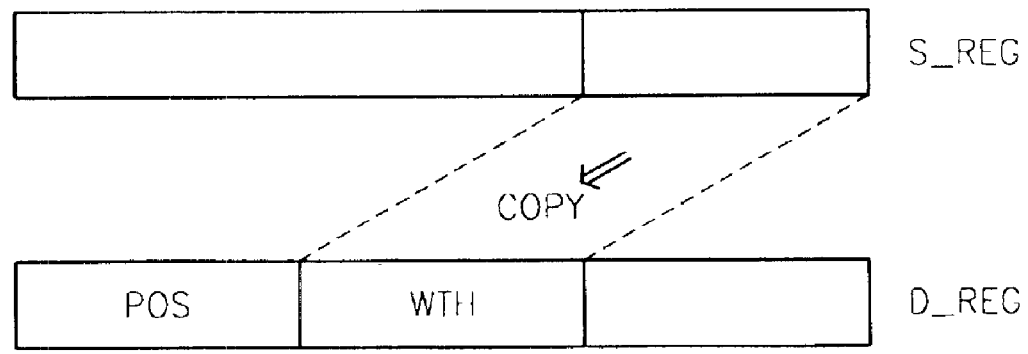

Preferred embodiments of the present invention will now be described hereinafter with reference to the accompanying drawings. Like reference numerals refer to like elements throughout this specification.

Referring to FIG. 2, a data extraction method 200 according to the present invention is performed using a source register and a destination register in a digital signal processor for extracting data from the source register and storing a extracted data in the destination register using a position value, which represents a reference position from which data starts being extracted, and an offset value, which represents the size of data to be extracted.

To be more specific, the data extraction method 200 comprises steps 210 through 270. In step 210, data of the M-th memory block in a memory, which is including a plurality of N-bit memory blocks, is stored in the upper half of the source register, and data of the (M+1)th memory block is stored in the lower half of the source register. Here, M and N are natural numbers.

In step 220, data of the size corresponding to the offset value, is extracted from the position corresponding to the position value in the source register and stored in the destination register. Also, the position value and the offset value are summed to obtain a new position value.

In step 230, a determination is made as to whether a new position value is greater than a predetermined modulo value. If it is determined in step 230 that the new position value is smaller than the predetermined modulo value, a flag signal in a first logic level is generated, in step 240. Thereafter, the steps 220 and 230 are repeated using the new position value.

If it is determined in step 230 that the new position value is greater than the predetermined modulo value, a flag signal in a second logic level is generated, in step 250. Thereafter, the data of the lower half of the source register is stored in the upper half of the source register, in step 260.

In step 270, in response to the flag signal in the second logic level, data of the (M+2)th memory block of the memory is stored in the lower half of the source register, and difference between the new position value and the predetermined modulo value is set as a next position value. The method goes back to step 220.

Here, each of the source and destination registers has a 2N-bit size, and the predetermined modulo value is N.

Figure 3:
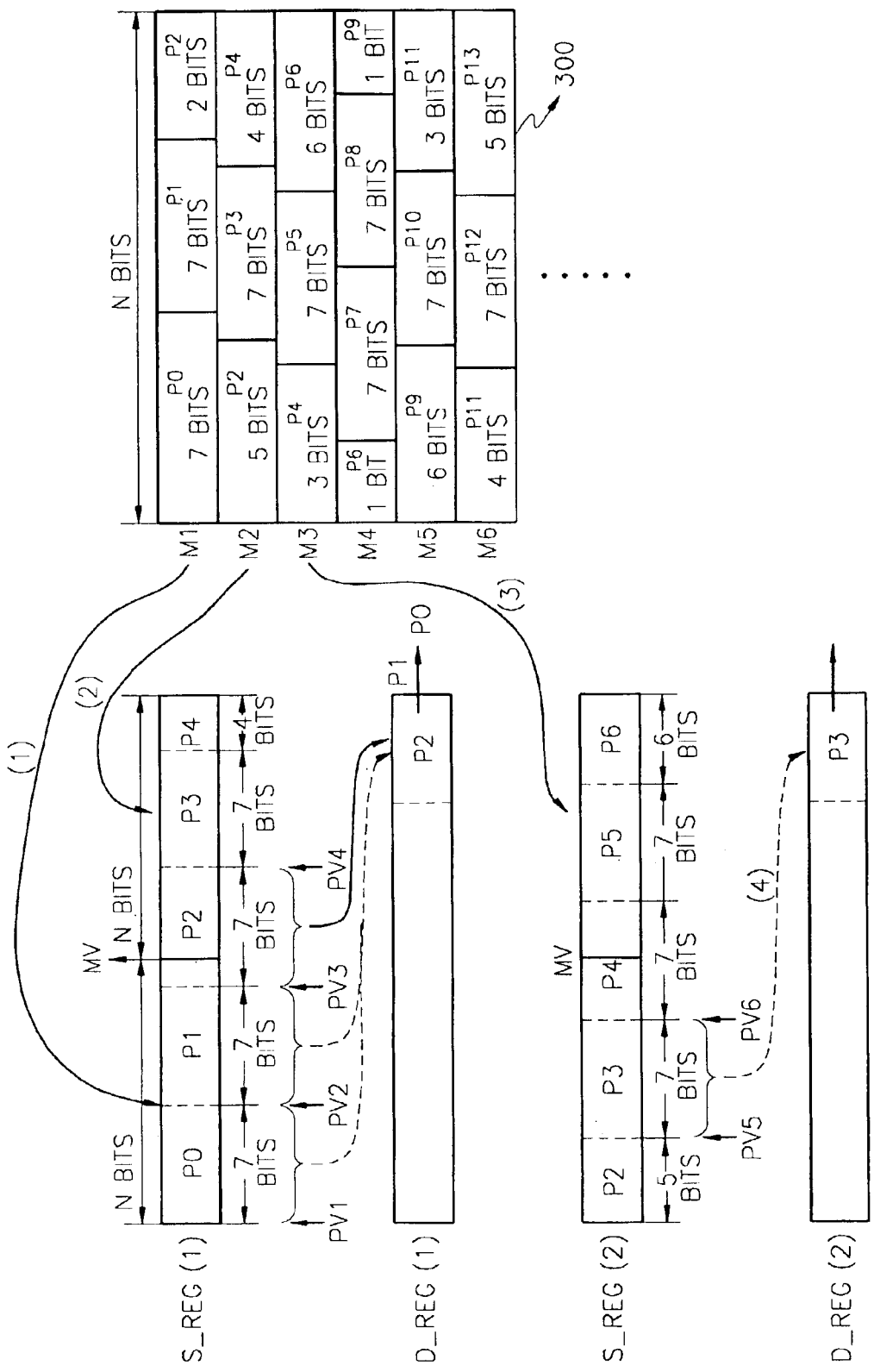
FIG. 3 is a diagram showing the data extraction method of FIG. 2.

The data extraction method 200 will now be described in more detail with reference to FIGS. 2 and 3. FIG. 3 shows two source registers S_REG (1) and S_REG (2) and two destination registers D_REG (1) and D_REG (2). Preferably, the source registers S_REG (1) and S_REG (2) are implemented a single source register. The single source register is shown as two different registers to visually explain the operation in which the data in the lower half of the source register S_REG (1) is copied into the upper half of the source register S_REG (1). Likewise, the two destination registers D_REG (1) and D_REG (2) are also one single destination register.

A memory is N bits in width. Here, N denotes a natural number. Generally, a memory is 16 bits or 32 bits in width, and the size of a data packet is given in bytes or words units. Accordingly, the data packet of byte-unit or word-unit size can be transferred without being divided.

However, a sequence of data packets the size of each of which is neither a byte unit nor a word unit is divided while being transferred from a memory to a register. Also, when the data packets are transferred and stored from the register to the memory, they are stored in the next memory without completely filling with data the 16-bit or 32-bit space of the previous memory. This is inefficient utilization of memory space.

A memory 300 in FIG. 3 has neither a byte-unit size nor a word-unit size. For convenience of explanation, FIG. 3 illustrates data packets P0 through P13, each comprising 7 bits. The memory 300 includes a plurality of 16-bit memory blocks. The first and second data packets P0 and P1, each having 7 bits, are stored in the first memory block M1.

The third data packet P2 having 7 bits is to be stored over two memory blocks because the whole packet cannot be stored in the first memory block M1. For example, two bits of the third data packet P2 are stored in the first memory block M1, and the remaining 5 bits are stored in the second memory block M2. The fourth data packet P3 is stored in the second memory block M2 without being divided.

As for the fifth 7-bit data packet P4, because the entire packet cannot be stored in the second memory block M2, only 4 bits are stored in the second memory block M2, and the remaining three bits are stored in the third memory block M3. Through this memory organizing method, the fourteenth data packet 13 is partially stored in the sixth memory block M6.

Referring to FIG. 3, data of the M-th memory block is stored in the upper half of the source register S_REG (1), and data of the (M+1)th memory block is stored in the lower half of the source register S_REG (1), in step 210.

Preferably, M is set to 1. Accordingly, the data of the first memory block M1 is stored in the upper half of the source register S_REG (1), and the data of the second memory block M2 is stored in the lower half of the source register S_REG (1). Thus, the first through fourth data packets P0 through P3 and part of the fifth data packet P4 are stored in the source register S_REG (1). This process is indicated by reference numerals (1) and (2) in FIG. 3.

The source register S_REG (1) is twice the size of a memory block, that is, the source register S_REG (1) is 32-bit in size.

In step 220, data of the size corresponding to an offset value is extracted from the position corresponding to a position value of the source register S_REG (1) and stored in the destination register D-REG (1), and the position value and the offset value are summed to obtain a new position value.

The position value PV refers to the reference position of data to be extracted, and the offset value refers to the size in bits of data to be extracted. Here, the offset value is set to be 7 bits for each data packet.

Data of the size corresponding to the offset value is extracted from the position corresponding to a first position value PV1. As the offset value corresponds to the size of a data packet, the first data packet P0 is extracted and stored in the destination register D_REG (1). The offset value is added to the first position value PV1 to create a second position value PV2. Accordingly, the second position value PV2 increases with 7 bits over the first position value PV1. For example, if the first position value PV1 is the $0^{th}$ bit of the source register S-REG (1), the second position value PV2 is the seventh bit of the source register S-REG (1).

In step 230, it is determined whether the second position value PV2 is greater than a predetermined modulo value MV. If the second position value PV2 is smaller than the modulo value MV, a flag signal having a first logic level is generated, in step 240. On the other hand, if the second position value PV2 is greater than the modulo value MV, a flag signal having a second logic level is generated, in step 250.

If the flag signal has the first logic level, the steps 220 and 230 repeat using the second position value PV2. Here, the modulo value MV is half the size of the source register S_REG (1) or the destination register D_REG (1). In FIG. 3, the modulo value MV is 16.

The modulo value MV denotes the range of an address indicated by the position value PV in the source register S_REG (1). When an address represented by a position value PV exceeds a modulo value MV, the position value PV goes back to a value smaller than a predetermined modulo value MV.

Given the modulo value MV being 16, the position value PV being 10, and the offset value being 3, the sum of the position value PV and the offset value is 13, which is smaller than the modulo value PV of 16. Accordingly, the value of 13 is set as a new position value PV. On the other hand, if the offset value is 8, the sum of the position value PV and the offset value is 18, which is greater than the modulo value MV of 16. Accordingly, the difference of 2 between 18 and 16 is a new position value PV. In this embodiment, the position value PV must always be smaller than the modulo value MV. This method is referred to as the modulo addressing performed in a DSP.

The second position value PV2 is a seventh bit in the source register S_REG (1), and the modulo value MV is 16. As the second position value PV2 is smaller than the modulo value MV, a flag signal having a first logic level is generated.

The flag signal is generated in a first or second logic level state, in response to the result of the comparison of the second position value PV2 and the modulo value MV. Here, the first logic level may be a logic high level or a logic low level. For convenience of explanation, the first logic level is a logic low level.

Since the flag signal is a logic low level, step 210 is performed again. Data of the size corresponding to the offset value is extracted from the position corresponding to the second position value PV2 in the source register S_REG (1). As the offset value corresponds to the size of a data packet, the second data packet P1 is extracted and stored in the destination register D_REG (1). At this time, the first data packet P0 stored in the destination register D_REG (1) is output to the outside.

Thereafter, the second position value PV2 is added to the offset value, and the sum of 14 is set as a third position value PV3.

As the third position value PV3 is smaller than the modulo value MV, a flag signal having a logic low level is generated. Data of the size corresponding to the offset value is extracted from the position corresponding to the third position value PV3 of the source register S_REG (1). Since the offset value corresponds to the size of a data packet, the third data packet P2 is extracted and stored in the destination register D_REG (1). At this time, the second data packet P1 stored in the destination register D_REG (1) is output.

The third position value PV3 of 14 and the offset value are summed, and the sum of 21 is set as a fourth position value PV4. Then, the fourth position value PV4 is compared with the modulo value MV to check if the former is greater than the latter. Sine the fourth position value PV4 of 21 is greater than the modulo value MV of 16, a flag signal having a second logic level is generated.

In response to the flag signal having a second logic level, the data of the lower half of the source register S_REG (1) is stored in the upper half of the source register S_REG (2), in step 260.

Responsive to the flag signal having a second logic level, data of the (M+2)th memory block in the memory 300 is stored in the lower half of the source register S_REG (2), and the remainder of the subtraction of the modulo value MV from the fourth position value PV4 is set as a fifth position value PV5, in step 270. The method goes back to step 220.

In FIG. 3, part of the third data packet P2, the fourth data packet P3, and part of the fifth data packet P4 are stored in the upper half of the source register S_REG (2). Data of the third memory block M3 in the memory 300, for example, part of the fifth data packet P4, the sixth data packet P5, and part of the seventh data packet P6 are stored in the lower half of the source register S_REG (2). This operation is indicated by reference numeral (3) in FIG. 3.

As in step 220, the difference of 5 between the fourth position value PV4 of 21 and the modulo value MV of 16 is set as a fifth position value PV5. Then, data of the size corresponding to the offset value is extracted from the fifth position value PV5 and stored in the destination register D_REG (2) in the source register S_REG (2). This operation is indicated with an arrow (4) in FIG. 3.

According to this embodiment of the present invention, Even if the size of a data packet is given in bit units instead of byte units, new data packets can be read consecutively from a memory, and the memory space can be effectively used.

The method 200 is referred to as a bit-addressing. Because bit-unit addresses instead of byte-unit addresses are allocated to a source or destination register, consecutive processing of a data packet of any size is possible without waste of memory.

Figure 4:
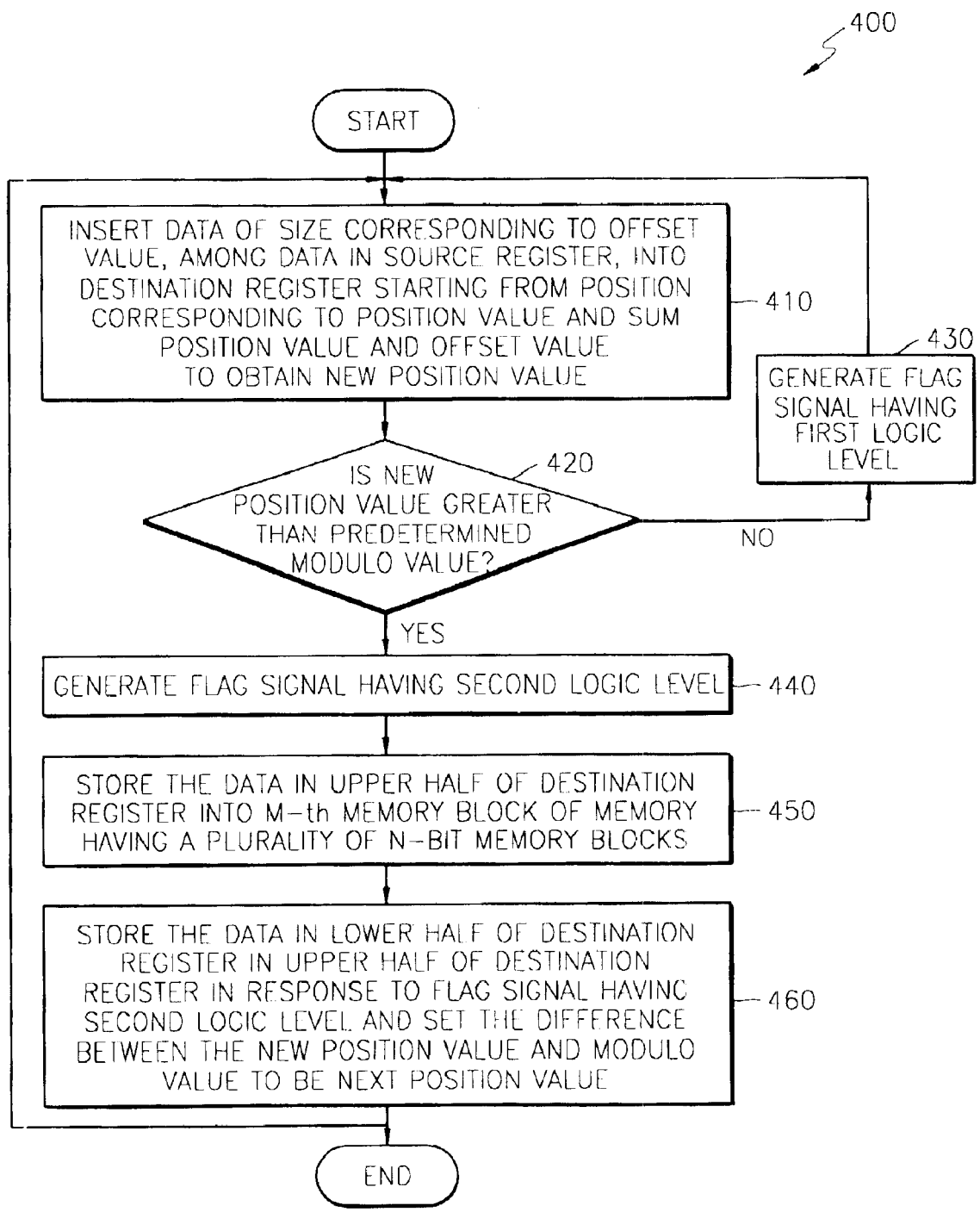
FIG. 4 is a flowchart illustrating a data insertion method according to a preferred embodiment of the present invention.
Figure 5:
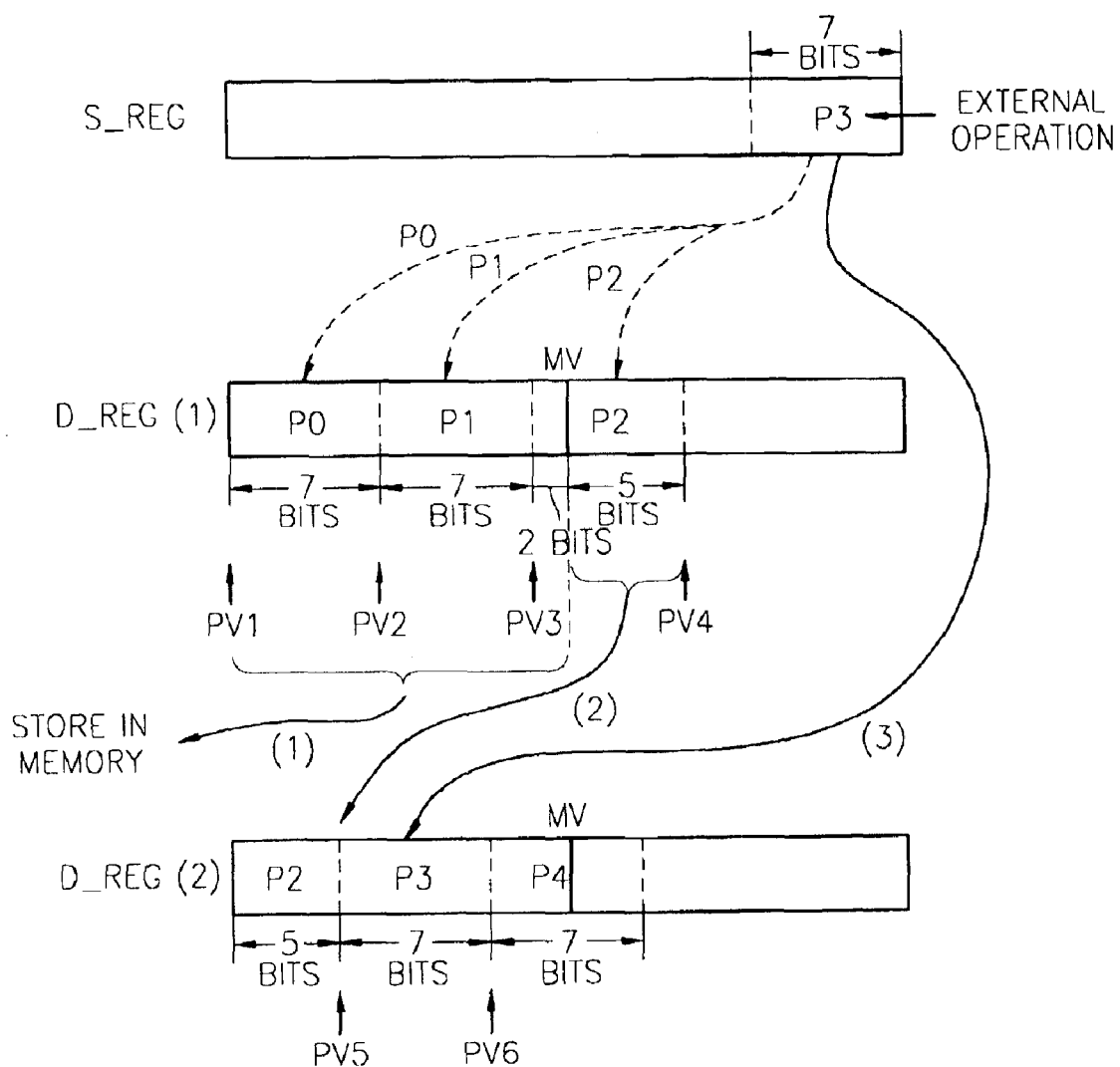
FIG. 5 is a diagram showing the data insertion method of FIG. 4.

FIG. 4 is a flowchart illustrating a data insertion method according to a preferred embodiment of the present invention. FIG. 5 is a conceptual diagram of the data insertion method of FIG. 4.

Referring to FIG. 4, a data insertion method 400 is performed using a source register and a destination register in a digital signal processor for inserting the data of the source register into the destination register using a position value, which represents the reference position into which data starts to be inserted, and an offset value, which represents the size of data to be inserted.

In step 410, data of the size corresponding to the offset value from the data in the source register is inserted into a position corresponding to the position value in the destination register, and the position value and the offset value are summed to obtain a new position value.

In step 420, a determination is made as to whether the new position value is greater than a predetermined modulo value. If it is determined in step 420 that the new position value is smaller than the modulo value, a flag signal in a first logic level is generated, in step 430. If it is determined in step 420 that the new position value is greater than the modulo value, a flag signal in a second logic level is generated, in step 440.

When the flag signal having a first logic level is generated, the steps 410 and 420 repeat using the new position value. On the other hand, when the flag signal having a second logic level is generated, the data of the upper half of the destination register is stored in the M-th memory block of a memory having a plurality of N-bit memory blocks, in step 450. Here, M and N are natural numbers.

In step 460, in response to the flag signal with the second logic level, the data of the lower half of the destination register is stored in the upper half of the destination register, and the difference between the new position value and the modulo value is set as a next position value. The method goes back to step 410. Here, each of the source and destination registers has a 2N-bit size, and the modulo value is N.

The data extraction method 400 will now be described in more detail with reference to FIG. 5. FIG. 5 shows two destination registers D_REG (1) and D_REG (2). The destination registers D_REG (1) and D_REG (2) share a single destination register even though they are shown as two different registers to explain the operation in which data in the lower half of the destination register D_REG (1) is copied into the upper half of the destination register D_REG (1).

As for a sequence of data packets the size of each of which is neither a byte unit nor a word unit, a data packet is divided while being transferred from a memory to a register.

In FIG. 5, for convenience of explanation, each of first through fifth data packets P0 and P1 has 7 bits, and a memory (not shown) includes a plurality of 16-bit memory blocks.

Referring to FIG. 5, data of the size corresponding to a predetermined offset value in the source register S_REG is inserted into the position corresponding to a first position value PV1 in the destination register D_REG (1), and the first position value PV1 and the offset value are summed to obtain a second position value PV2, in step 410.

The source register S_REG and the destination register D_REG (1) are twice the size of a memory block. For example, each of them has a 32-bit size.

A position value PV refers to the reference position into which data starts to be inserted, and an offset value refers to the size of data to be inserted. Here, the offset value is set to be 7, which corresponds to the size of a data packet to be inserted.

If the first position value PV1 is set to be 0, and the offset value is set to be 7, the first data packet P0 stored in the source register S_REG is inserted into the destination register D_REG (1). The second position value PV2 is 7, which is the sum of the first position value PV1 of 0 and the offset value of 7.

In step 410, it is determined whether the second position value PV2 is greater than a predetermined modulo value MV. If the second position value PV2 is smaller than the modulo value MV, a flag signal having a first logic level is generated, in step 430. On the other hand, if the second position value PV2 is greater than the modulo value MV, a flag signal having a second logic level is generated, in step 440.

When the flag signal having the first logic level is generated, the steps 410 and 420 repeat using the second position value PV2.

The second position value PV2 is compared with a predetermined modulo value MV to check if the former is greater than the latter. The modulo value MV is half the size of the source register S_REG (1) or the destination register D_REG (1). Accordingly, the modulo value MV in FIG. 5 is 16. The modulo value MV is similar to the modulo value described in the data extraction method 200, so it will not be described in more detail.

The second position value PV2 is a seventh bit in the destination register D_REG (1), and the modulo value MV is 16. As the second position value PV2 is smaller than the modulo value MV, a flag signal having a first logic level is generated.

The flag signal is generated in a first or second logic level state, in response to the result of the comparison of the second position value PV2 and the modulo value MV. Here, the first logic level may be a logic high level or a logic low level. For convenience of explanation, the first logic level is a logic low level.

When a flag signal has a logic low level, steps 410 and 420 repeat. For example, data of the size corresponding to the offset value is extracted from the source register S_REG and inserted into the second position value PV2 on the destination register D_REG (1). As the offset value corresponds to the size of a data packet, the second data packet P1 is extracted and stored in the destination register D_REG (1).

Then, the second position value PV2 is added to the offset value, and the sum of 14 is set as a third position value PV3.

As the third position value PV3 of 14 is smaller than the modulo value MV of 16, a flag signal having a logic low level is generated.

When the flag signal having a logic low level is generated, data of the size corresponding to the offset value is inserted into the third position value PV3 in the destination register D_REG (1). Since the offset value corresponds to the size of a data packet, the third data packet P2 is inserted into the destination register D_REG (1). The third position value PV3 of 14 and the offset value are summed, and the sum of 21 is set to be a fourth position value PV4.

Thereafter, the fourth position value PV4 is compared with the modulo value MV to check if the former is greater than the latter. Since the fourth position value PV4 of 21 is greater than the modulo value MV of 16, a flag signal having a second logic level is generated.

When the flag signal has a second logic level, the data of the upper half of the destination register D_REG (1) is stored in the M-th memory block of a memory (not shown) having a plurality of N-bit memory blocks, in step 450. Here, M and N are natural numbers.

Responsive to the flag signal having a second logic level, the data of the lower half of the destination register D-REG (1) is stored in the upper half of the destination register D_REG (2), and the remainder of the subtraction of the modulo value MV from the fourth position value PV4 is set as a fifth position value PV5, in step 460. Then, the method goes back to step 410.

In FIG. 5, the first and second data packets P0 and P1 and part of the third data packet P2 are stored in the M-th memory block of the memory (not shown), as shown with an arrow (1). The data stored in the lower half of the destination register D_REG (1), that is, 5 bits of the third data packet P2, is stored in the upper half of the destination register D_REG (2), as shown with an arrow (2).

Then, another data of the size corresponding to the offset value is inserted into the position corresponding to the fifth position value PV5 in the destination register D_REG (2). That is, the fourth data packet P3 is extracted from the source register S_REG and is inserted into the destination register D_REG (2), as shown with an arrow (3).

According to this embodiment of the present invention, even if the size of a data packet is given in bit units instead of byte units, new data packets can be stored in a memory one after another, and accordingly, the memory space can be effectively used.

The data insertion method 400 is referred to as bit-addressing. Because bit-unit addresses other than byte-unit addresses are allocated to a source or destination register, consecutive processing of a data packet of any size is possible without waste of a memory.

Figure 6:
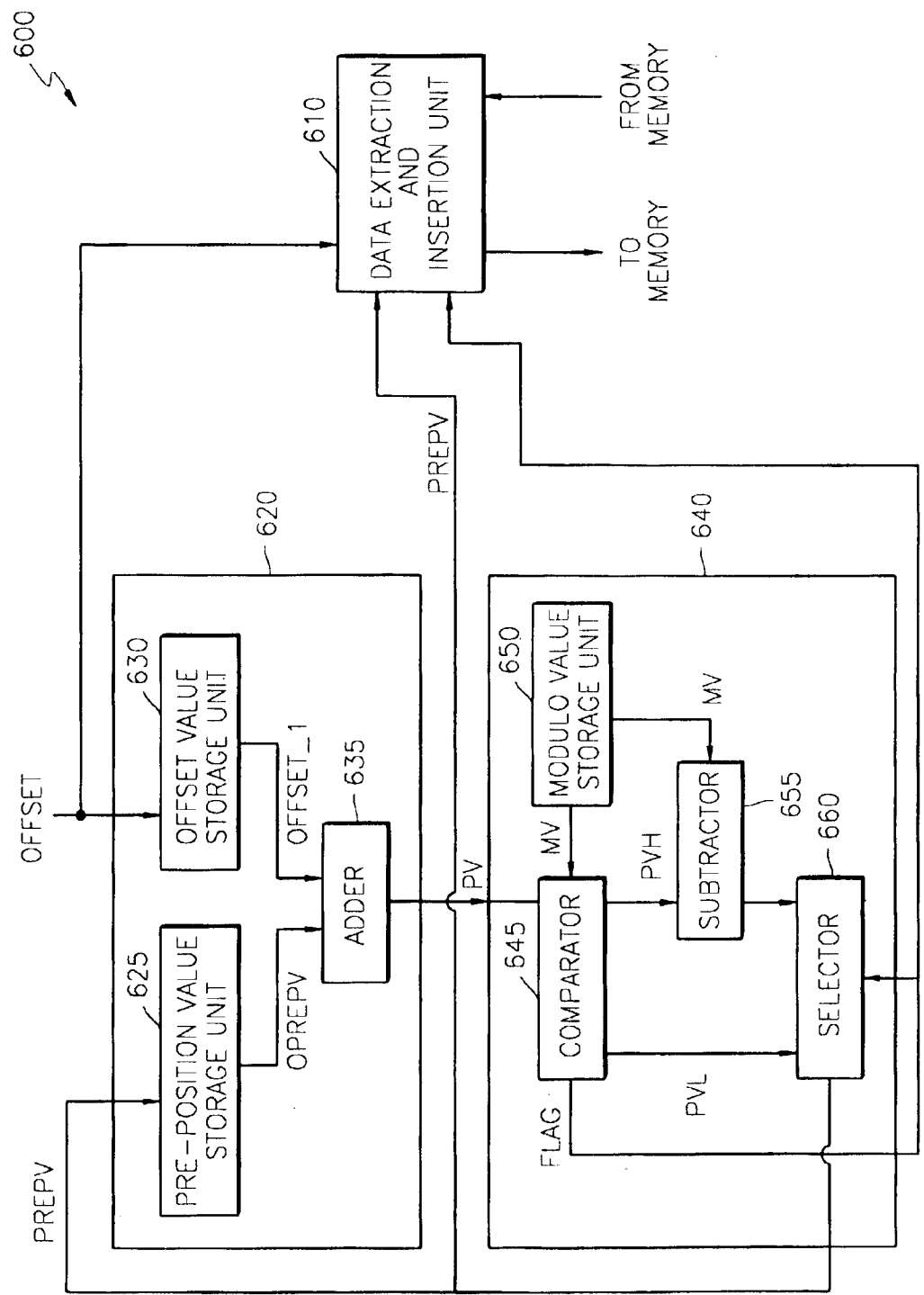
FIG. 6 is a block diagram of a data extraction and insertion device according to a preferred embodiment of the present invention.

FIG. 6 is a block diagram of a data extraction and insertion device 600 according to a preferred embodiment of the present invention. Referring to FIG. 6, the data extraction and insertion device 600 in a digital signal processor (DSP) includes a data extraction and insertion unit 610, a position value generation unit 620, and a flag signal generation unit 640.

The data extraction and insertion unit 610 receives a position value PV and an offset value OFFSET representing the size of a data to be extracted, and extracts or insert data from a source register to a destination register in response to the first logic level of a flag signal FLAG. In response to a flag signal having a second logic level, the unit 610 stores data received from a memory (not shown) in the source or destination register or stores data received from the source or destination register in the memory.

Upon data extraction, the data extraction and insertion unit 610 extracts data of the size corresponding to the offset value OFFSET from the source register and inserts the extracted data into the position corresponding to a pre-position value PREPV in the destination register, in response to the flag signal FLAG with a first logic level.

In response to the flag signal FLAG with a second logic level, the data extraction and insertion unit 610 stores the data of the lower half unit of the source register in the upper half of the source register and also stores the data of the M-th memory block of a memory (not shown) having a plurality of N-bit memory blocks in the lower half of the source register.

Upon data insertion, the data extraction and insertion unit 610 inserts data of the size corresponding to the offset value OFFSET into the destination register at the position corresponding to the pre-position value PREPV in response to the flag signal FLAG having a first logic level. In response to the flag signal FLAG with a second logic level, the data extraction and insertion unit 610 stores the data of the upper half unit of the destination register in the M-th memory block of a memory (not shown) having a plurality of N-bit memory blocks and also stores the data of the lower half of the destination register in the upper half of the destination register.

The position value generation unit 620 sums the pre-position value PREPV and offset value OFFSET both received from external sources to obtain a position value PV.

The position value generation unit 620 includes a pre-position value storage unit 625 for storing a pre-position value PREPV, an offset value storage unit 630 for storing an offset value OFFSET received from an external source, and an adder 635 for adding the output OFFSET_1 of the offset value storage unit 630 to the output OPREPV of the pre-position value storage unit 625 to obtain a position value PV.

The flag signal generation unit 640 receives the position value PV, and outputs the position value PV as a pre-position value PREPV if the position value PV is smaller than a predetermined modulo value MV. If the position value PV is greater than the modulo value MV, the difference between the two values is output as the pre-position value PREPV. The flag signal generation unit 640 generates a flag signal depending on the result of the comparison of the position value PV with the modulo value MV.

The flag signal generation unit 640 includes a modulo value storage unit 650, a comparator 645, a subtractor 655, and a selector 660. The modulo value storage unit 650 stores the modulo value MV. The comparator 645 compares the position value PV with the modulo value MV received from the modulo value storage unit 650, and outputs the position value PV to the selector if the position value PV is smaller than the modulo value MV. However, if the position value PV is greater than the modulo value MV, the comparator 645 outputs the position value PV to the subtractor 655. The comparator 645 also generates a flag signal FLAG depending on the result of the comparison of the position value PV with the modulo value MV.

The comparator 645 generates a flag signal FLAG having a first logic level if the position value PV is smaller than the modulo value MV, or generates a flag signal FLAG having a second logic level if the position value PV is greater than the modulo value MV.

The subtractor 655 receives the position value PV and the modulo value MV and subtracts the latter from the former.

The selector 660 selects one of either the position value PV output from the comparator 645 or the output of the subtractor 655 in response to the flag signal FLAG to output a selected value as a pre-position value PREPV.

If the flag signal FLAG has a first logic level, the selector 660 selects the position value PV received from the comparator 645. If the flag signal FLAG has a second logic level, the selector 660 selects the output of the subtractor 655.

Each of the source and destination registers has a 2N-bit size, and the modulo value is N.

The data extraction method 200 and the data insertion method 400 can be implemented using a data extraction and insertion device 600, as explained before.

The position value generation unit 620 adds the offset value OFFSET, which is received from an external source, to the pre-position value PREPV, which is received from an external source, to obtain a position value PV.

The pre-position value PREPV is generated by the selector 660 in the flag signal generation unit 640. Upon data extraction, the pre-position value PREPV represents the reference position in a source register from which data starts to be extracted. Upon data insertion, the pre-position value PREPV represents the reference position in a destination register into which data starts to be inserted.

The offset value OFFSET represents the size of data to be extracted or inserted.

The pre-position value PREPV and the offset value OFFSET are applied to the data extraction and insertion unit 610. The data extraction and insertion unit 610 extracts or inserts data in response to the pre-position value PREPV and the offset value OFFSET.

The pre-position value PREPV and the offset value OFFSET are also applied to the position value generation unit 620. In the position value generation unit 620, the pre-position value storage unit 625 receives and stores the pre-position value PREPV. The offset value storage unit 630 stores the received offset value OFFSET. The pre-position value storage unit 625 and the offset value storage unit 630 may be registers.

The adder 635 adds the output OFFSET_1 of the offset value storage unit 630 to the output OPREPV of the pre-position value storage unit 625, to obtain a position value PV. The output OPREPV of the pre-position value storage unit 625 is identical to the pre-position value PREPV, and the output OFFSET_1 of the offset value storage unit 630 is identical to the offset value OFFSET.

If the pre-position value PREPV is 0 and the offset value is 7, the position value PV is 7, which is the sum of the pre-position value PREPV of 0 and the offset value of 7.

The flag signal generation unit 640 receives the position value PV, compares the position value PV with the predetermined modulo value MV, and generates the position value PV as the pre-position value PREPV if the position value PV is smaller than the modulo value MV. If the position value PV is greater than the modulo value MV, the flag signal generation unit 640 generates the difference between the position value PV and the modulo value MV to serve as the pre-position value PREPV. Also, the flag signal generation unit 640 generates a flag signal FLAG depending on the result of the comparison of the position value PV and the modulo value MV.

The modulo value MV can be understood in the same way as described with the data extraction method 200 and the data insertion method 400. If the width of a memory (not shown) is 16 bits, the modulo value is 16. The modulo value MV is stored in the modulo value storage unit 650.

The comparator 645 compares the position value PV with the modulo value MV received from the modulo value storage unit 650. If the position value PV is smaller than the modulo value MV, the comparator 645 outputs the position value PV to the selector 660. If the position value PV is greater than the modulo value MV, the comparator 645 outputs the position value PV to the subtractor 655.

The comparator 645 also generates a flag signal FLAG depending on the result of the comparison of the position value PV and the modulo value MV. The flag signal is generated in a first logic level state if the position value PV is smaller than the modulo value MV. The flag signal is generated in a second logic level state if the position value PV is greater than the modulo value MV.

The first and second logic levels may be a logic high level and a logic low level, respectively, or vice versa. If the flag signal FLAG is generated in a first logic level state, the data extraction and insertion unit 610 extracts or inserts data using the pre-position value PREPV and the offset value OFFSET. If the flag signal FLAG is generated in a second logic level state, the data extraction and insertion unit 610, upon data extraction, stores the data of the lower half of a source register in the upper half thereof and also stores 16-bit data from a memory in the lower half of the source register. If the flag signal FLAG is generated in a second logic level state, the data extraction and insertion unit 610, upon data insertion, stores the data of the upper half of a destination register in the memory and also stores the data of the lower half data of the destination register in the upper half of the destination register.

The subtractor 655 subtracts the modulo value from the output signal PVH of the comparator 645. Since the output signal PVH of the comparator 645 is generated when the position value PV is greater than the modulo value MV, it is positive.

The selector 660 selects the output signal PVL of the comparator 645 if the flag signal FLAG has a first logic level, and outputs the selected signal PVL as a pre-position value PREPV. If the flag signal FLAG has a second logic level, the selector 660 selects the output of the subtractor 655 to serve as a pre-position value PREPV.

To sum up, if the position value PV is smaller than the modulo value MV, the comparator 645 applies the position value PV in the form of the output signal PVL to the selector 660, and outputs a flag signal having a first logic level. In response to the flag signal having a first logic level, the selector 660 selects the output signal PVL of the comparator 645 and outputs it as a pre-position value PREPV. The data extraction and insertion unit 610 extracts or inserts data using the proposition value PREPV and the offset value OFFSET in response to the flag signal having a first logic level.

If the position value PV is greater than the modulo value MV, the comparator 645 applies the position value PV in the form of the output signal PVH to the subtractor 655 and generates a flag signal FLAG in a second logic level. The subtractor 655 subtracts the modulo value MV from the output signal PVH of the comparator 645 and applies the difference to the selector 660.

In response to the flag signal having a second logic level, the selector 660 selects the output signal of the subtractor 655 and outputs it as a pre-position value PREPV. The data extraction and insertion unit 610 stores data in the memory or reads data from the memory in response to the flag signal FLAG having a second logic level.

As described above, in a data extraction/insertion method and a data extraction and insertion device according to the present invention, a sequence of data packets that have neither byte-unit nor word-unit size is effectively extracted or inserted.

While this invention has been particularly shown and described with reference to preferred embodiments thereof, it will be understood by those skilled in the art that various changes in form and details may be made therein without departing from the spirit and scope of the invention as defined by appended claims.

What is claimed is:

1. A data extraction method in a digital signal processor, wherein the digital signal processor includes a source register and a destination register, and extracting data from the source register and storing the extracted data in the destination register using a position value, the position value representing the reference position of data extraction, and an offset value, the offset value representing the size of data to be extracted, the data extraction method comprising:

(a) storing the data of an M-th memory block in a memory having a plurality of N-bit memory blocks, into an upper portion of the source register, and storing the data of an (M+1)th memory block into a lower portion of the source register, wherein M and N are natural numbers;

(b) extracting data of the size corresponding to the offset value, from the position corresponding to the position value in the source register, storing the extracted data in the destination register, and summing the position value and the offset value to obtain a new position value;

(c) determining whether the new position value is greater than a predetermined modulo value, generating a flag signal in a first logic level if the new position value is smaller than the modulo value, and generating a flag signal in a second logic level if the new position value is greater than the modulo value;

(d) repeating steps (b) and (c) using the new position value if the flag signal has a first logic level, and storing the data of the lower portion of the source register in the upper portion of the source register if the flag signal is in a second logic level; and (e) storing the data of an (M+2)th memory block of the memory in the lower portion of the source register in response to the flag signal in the second logic level, setting a next position value by the difference between the new position value and the modulo value, and going back to step (b).

2. The data extraction method of claim 1, wherein the upper portion of the source register is one half of the source register.

3. The data extraction method of claim 2, wherein each of the source and destination registers has a 2N-bit size.

4. The data extraction method of claim 2, wherein the modulo value is N.

5. A data insertion method in a digital signal processor, the digital signal processor including a source register and a destination register and inserting data from the source register into the destination register using a position value, the position value representing the reference position into which the data is to be inserted, and an offset value, the offset value representing a size of data to be inserted, the data insertion method comprising:

(a) inserting data of the size corresponding to the offset value in the source register, into the position corresponding to the position value in the destination register to store therein, and summing the position value and the offset value to obtain a new position value;

(b) determining whether the new position value is greater than a predetermined modulo value, and generating a flag signal in a first logic level if the new position value is smaller than the modulo value, or generating a flag signal in a second logic level if the new position value is greater than the modulo value;

(c) repeating steps (a) and (b) using the new position value if the flag signal has a first logic level, or storing the data of the upper half of the destination register in the M-th memory block of a memory having a plurality of N-bit memory blocks if the flag signal is in a second logic level, wherein M and N are natural numbers; and (d) storing the data of the lower half of the destination register in the upper half of the destination register and setting a next position value by the difference between the new position value and the modulo value, in response to the flag signal having the second logic level, and going back to step (a).

6. The data insertion method of claim 5, wherein each of the source and destination registers has a 2N-bit size.

7. The data insertion method of claim 5, wherein the modulo value is N.

8. A data extraction and insertion device, the device comprising:

a data extraction and insertion unit for receiving a pre-position value and an offset value representing a size of data to be extracted, extracting or inserting data from a source register to a destination register in response to a first logic level of a flag signal, and storing data received from a memory in a source or destination register or storing data received from the source or destination register in the memory in response to a second logic level of the flag signal;

a position value generation unit for summing the pre-position value and the offset value both received from external sources to obtain a position value; and a flag signal generation unit for receiving the position value, outputting the position value as the pre-position value if the position value is smaller than a predetermined modulo value, outputting the difference between the position value and the modulo value to serve as the pre-position value if the position value is greater than the modulo value, and generating a flag signal depending on the result of the comparison of the position value with the modulo value.

9. The data extraction and insertion device of claim 8, wherein the data extraction and insertion device is implemented in a DSP.

10. The data extraction and insertion device of claim 9, wherein the position value generation unit comprises:

a pre-position value storage unit for storing the pre-position value;

an offset value storage unit for storing an offset value received from an external source; and an adder for adding an output of the offset value storage unit to an output of the pre-position value storage unit to obtain the position value.

11. The data extraction and insertion device of claim 9, wherein the flag signal generation unit comprises:

a modulo value storage unit for storing the modulo value;

a comparator for comparing the position value with the modulo value received from the modulo value storage unit, outputting the position value to a selector if the position value is smaller than the modulo value, outputting the position value to a subtractor if the position value is greater than the modulo value, and generating a flag signal depending on the result of the comparison of the position value with the modulo value; wherein the subtractor receives the position value and the modulo value and subtracts the modulo value from the position value, and wherein the selector selects one either from the position value output from the comparator or from an output of the subtractor in response to the flag signal to output a selected value as the pre-position value.

12. The data extraction and insertion device of claim 9, wherein the comparator generates the flag signal having a first-logic level if the position value is smaller than the modulo value, or generates the flag signal having a second logic level if the position value is greater than the modulo value.

13. The data extraction and insertion device of claim 9, wherein the selector selects the position value output from the comparator if the flag signal is in a first logic level, and selects the output of the subtractor if the flag signal is in a second logic level.

14. The data extraction and insertion device of claim 9, wherein upon data extraction in response to the flag signal in a first logic level, the data extraction and insertion unit extracts data of the size corresponding to the offset value, from the data in the source register, and inserts the data into the position corresponding to the pre-position value in the destination register, and, in response to the flag signal in a second logic level, the data extraction and insertion unit stores the data of the lower half of the source register in the upper half of the source register, and also stores the data of the M-th memory block of a memory, which has a plurality of N-bit memory blocks, in the lower half of the source register, wherein M and N are natural numbers.

15. The data extraction and insertion device of claim 9, wherein upon data insertion in response to the flag signal in a first logic level, the data extraction and insertion unit inserts data of the size corresponding to the offset value, into the position corresponding to the pre-position value in the destination register, and, in response to the flag signal with a second logic level, the data extraction and insertion unit stores the data of the upper portion of the destination register in the M-th memory block of a memory having a plurality of N-bit memory blocks, and also stores the data of the lower half of the destination register in the upper half of the destination register, wherein M and N are natural numbers.

16. The data extraction and insertion device of claim 9, wherein each of the source and destination registers has a 2N-bit size.

17. The data extraction and insertion device of claim 9, wherein the modulo value is N.

18. A DSP having a data extraction and insertion device comprising:

a position value generation unit for summing a pre-position value and an offset value both received from external sources to obtain a position value;

a flag signal generation unit for receiving the position value, outputting the position value as the pre-position value if the position value is smaller than a predetermined modulo value, outputting the difference between the position value and a modulo value to serve as the pre-position value if the position value is greater than the modulo value, and generating a flag signal depending on the result of the comparison of the position value with the modulo value; and means for extracting and inserting a sequence of data packets independent of byte or word size, wherein said means receives the pre-position value and the offset value, extracts or inserts data from a source register to a destination register in response to a first logic level of a flag signal, and stores data received from a memory in a source or destination register or stores data received from the source or destination register in the memory in response to a second logic level of the flag signal.

* * * * *